US007617317B2

(12) United States Patent
Jones et al.

(10) Patent No.: US 7,617,317 B2
(45) Date of Patent: Nov. 10, 2009

(54) METHOD AND SYSTEM FOR ALLOWING MULTIPLE SERVICE PROVIDERS TO SERVE USERS VIA A COMMON ACCESS NETWORK

(75) Inventors: Bryce A. Jones, Overland Park, KS (US); Jason Delker, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 788 days.

(21) Appl. No.: 10/004,994

(22) Filed: Dec. 3, 2001

(65) Prior Publication Data
US 2003/0212800 A1 Nov. 13, 2003

(51) Int. Cl.
*G06F 15/16* (2006.01)
(52) U.S. Cl. .................. 709/227; 709/203; 709/225; 709/228; 726/2; 726/3
(58) Field of Classification Search .................. 709/225, 709/227, 229, 218; 370/252; 713/155, 156; 726/2–4
See application file for complete search history.

(56) References Cited

U.S. PATENT DOCUMENTS

| | | | | |
|---|---|---|---|---|
| 5,898,780 | A * | 4/1999 | Liu et al. ..................... | 713/155 |
| 5,983,098 | A | 11/1999 | Gerszberg et al. | |
| 6,041,325 | A | 3/2000 | Shah et al. | |
| 6,243,754 | B1 * | 6/2001 | Guerin et al. ............... | 709/227 |
| 6,259,405 | B1 * | 7/2001 | Stewart et al. .............. | 342/457 |
| 6,269,395 | B1 | 7/2001 | Blatherwick et al. | |
| 6,324,579 | B1 * | 11/2001 | Bleuse et al. ............... | 709/227 |
| 6,339,761 | B1 * | 1/2002 | Cottingham ................. | 705/14 |
| 6,345,043 | B1 | 2/2002 | Hsu | |
| 6,412,079 | B1 * | 6/2002 | Edmonds et al. ............ | 714/11 |
| 6,553,568 | B1 * | 4/2003 | Fijolek et al. ............... | 709/218 |
| 6,571,221 | B1 * | 5/2003 | Stewart et al. ............... | 705/52 |
| 6,603,758 | B1 * | 8/2003 | Schmuelling et al. ....... | 709/227 |
| 6,636,502 | B1 * | 10/2003 | Lager et al. ................. | 370/352 |
| 6,697,806 | B1 * | 2/2004 | Cook .......................... | 709/227 |
| 6,748,439 | B1 * | 6/2004 | Monachello et al. ........ | 709/227 |
| 6,769,000 | B1 * | 7/2004 | Akhtar et al. ........... | 707/103 R |
| 6,795,700 | B2 * | 9/2004 | Karaoguz et al. ........... | 370/468 |
| 6,834,341 | B1 * | 12/2004 | Bahl et al. .................. | 709/225 |
| 6,879,584 | B2 * | 4/2005 | Thro et al. .................. | 370/352 |
| 6,931,109 | B1 * | 8/2005 | Cook .......................... | 709/239 |

(Continued)

FOREIGN PATENT DOCUMENTS

WO WO 01/71983 9/2001

(Continued)

OTHER PUBLICATIONS

PCT International Preliminary Examination Report for PCT/US02/31413 dated Jul. 26, 2004.

(Continued)

*Primary Examiner*—Ramy M Osman

(57) ABSTRACT

A method for allowing multiple service providers to provide services via a common access network. The access network is arranged with multiple logical network layers, each specific to a respective service provider. Upon successful authentication of a subscriber by a given service provider, the access network assigns that subscriber to the logical layer specific to the authenticating service provider. The access network then handles communication traffic in that logic layer in a manner specific to the service provider.

16 Claims, 4 Drawing Sheets

U.S. PATENT DOCUMENTS

| | | | |
|---|---|---|---|
| 6,970,927 B1 * | 11/2005 | Stewart et al. | 709/225 |
| 7,058,022 B1 * | 6/2006 | Carolan et al. | 709/218 |
| 7,072,962 B2 * | 7/2006 | Hori | 709/225 |
| 7,181,530 B1 * | 2/2007 | Halasz et al. | 709/228 |
| 2002/0013844 A1 * | 1/2002 | Garrett et al. | 709/225 |
| 2002/0022483 A1 * | 2/2002 | Thompson et al. | 455/439 |
| 2002/0174335 A1 * | 11/2002 | Zhang et al. | 709/229 |
| 2002/0191572 A1 * | 12/2002 | Weinstein et al. | 370/338 |
| 2004/0181692 A1 * | 9/2004 | Wild et al. | 713/201 |

FOREIGN PATENT DOCUMENTS

| | | |
|---|---|---|
| WO | WO 02/080487 A2 | 10/2002 |

OTHER PUBLICATIONS

Written Opinion from International Application No. PCT/US02/31413, dated Oct. 23, 2003.

International Search Report prepared for related PCT Application No. PCT/US02/31413, dated Mar. 6, 2003.

Zuidweg, H., "The Evolution of IN Service Logic," Intelligent Network Workshop, 1998. IN '98. $7^{th}$ IEEE, May 10-13, 1998, pp. 14-27.

Tutorial: Mobile IP, http://www.computer.org/internet/v2n1/perkins.htm, printed from the World Wide Web on Jul. 26, 2001.

* cited by examiner

METHOD AND SYSTEM FOR ALLOWING MULTIPLE SERVICE PROVIDERS TO SERVE USERS VIA A COMMON ACCESS NETWORK

BACKGROUND

1. Field of the Invention

The present invention relates to telecommunications, and more particularly to a method and system for allowing multiple service providers to serve users via a common access network such as a wireless local access network for instance.

2. Description of Related Art

In recent years, wireless local area networking has become increasingly popular. Provided with a suitable wireless communication device, a user operating in a wireless local area network (WLAN) can conveniently gain access to network resources without being tethered to a fixed location.

A WLAN can take various forms, one of the most common of which is that described by industry standard IEEE 802.11 (as modified by 802.11b). Applicable details of 802.11 are well known to those of ordinary skill in the art and therefore will not be described.

Generally speaking, in an 802.11 WLAN, one or more access points (APs) are provided as base stations to interface between mobile stations and a distribution system (e.g., a wired Ethernet or other system). When a mobile station first enters an 802.11 WLAN, the mobile station becomes associated with a nearby AP and becomes authenticated for purposes of communicating within the WLAN. Depending on the scope of authentication, the mobile station may then be able to communicate with other mobile stations operating on the WLAN and/or with various servers or other entities in the distribution system. Further, the distribution system may provide connectivity with another network such as the Internet for instance. Therefore, the mobile station might be able to access resources on that other network as well.

SUMMARY

The present invention is directed to a method and system for enabling multiple service providers to serve subscribers via a common wireless access network. The common wireless access network preferably includes or is a WLAN, such as an 802.11 WLAN for instance, but it could take other forms as well.

In an exemplary embodiment of the invention, the access network is arranged to serve one or more mobile subscriber stations (such as 802.11-compliant stations), and the access network provides connectivity to a plurality of service provider systems (e.g., discrete service provider networks, or separate service provider systems on a common network). Each service provider system may be owned and operated by a respective service provider. And each service provider may have its own set of subscribers, that is, client stations and/or users that are registered to access services of the service provider and/or to be billed by the service provider for accessing services.

When a mobile station enters the access network, the access network may give the mobile station access only to certain resources on the access network or may have some other default access that is enforced by an access point, a switch and/or other nodes on the network. For example, an access network may by default allow the mobile station to engage in IP communications with other mobile stations in the access network or with web servers in the access network. As another example, if the access network provides connectivity with the Internet, the access network may by default allow the mobile station to engage in IP communications with entities on the Internet.

According to the exemplary embodiment, upon gaining access to the access network (or at another time during operation in the access network), the mobile station then sends into the access network an authentication request that indicates (i) a designated one of the service providers and (ii) authentication credentials. The access network then forwards that authentication request to the designated service provider, to facilitate authentication of the mobile station.

In turn, the designated service provider seeks to authenticate the mobile station and provides an authentication response to the access network. The authentication response may indicate that the mobile station is not authenticated (e.g., if the mobile station does not subscribe to the designated service provider's service). Alternatively, the authentication response may indicate that the mobile station is authenticated, and the authentication response may provide the access network with service qualifications for the mobile station (such as types or levels of communication that the mobile station is allowed to perform).

Upon receipt of the authentication response, the access network then preferably controls communications accordingly. In particular, if the authentication response indicates that the designated service provider authenticated the mobile station, then the access network may allow the mobile station to communicate within a layer of access-network traffic (e.g., in a specific sub-network for instance) that is segregated for the designated service provider. Within that segregated layer, the access network may then provide the mobile station with services that are specific to the service provider, such as customizing access-network resources to make them appear as though they are provided by the service provider. Further, upon successful authentication, the access network may enforce service qualifications specified by the designated service provider.

Alternatively, if the authentication response indicates that the designated service provider did not authenticate the mobile station, then the access network may continue to restrict the mobile station to communicate only to the extent the access network allowed by default (or in another manner desired).

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Overview

Figure 1:
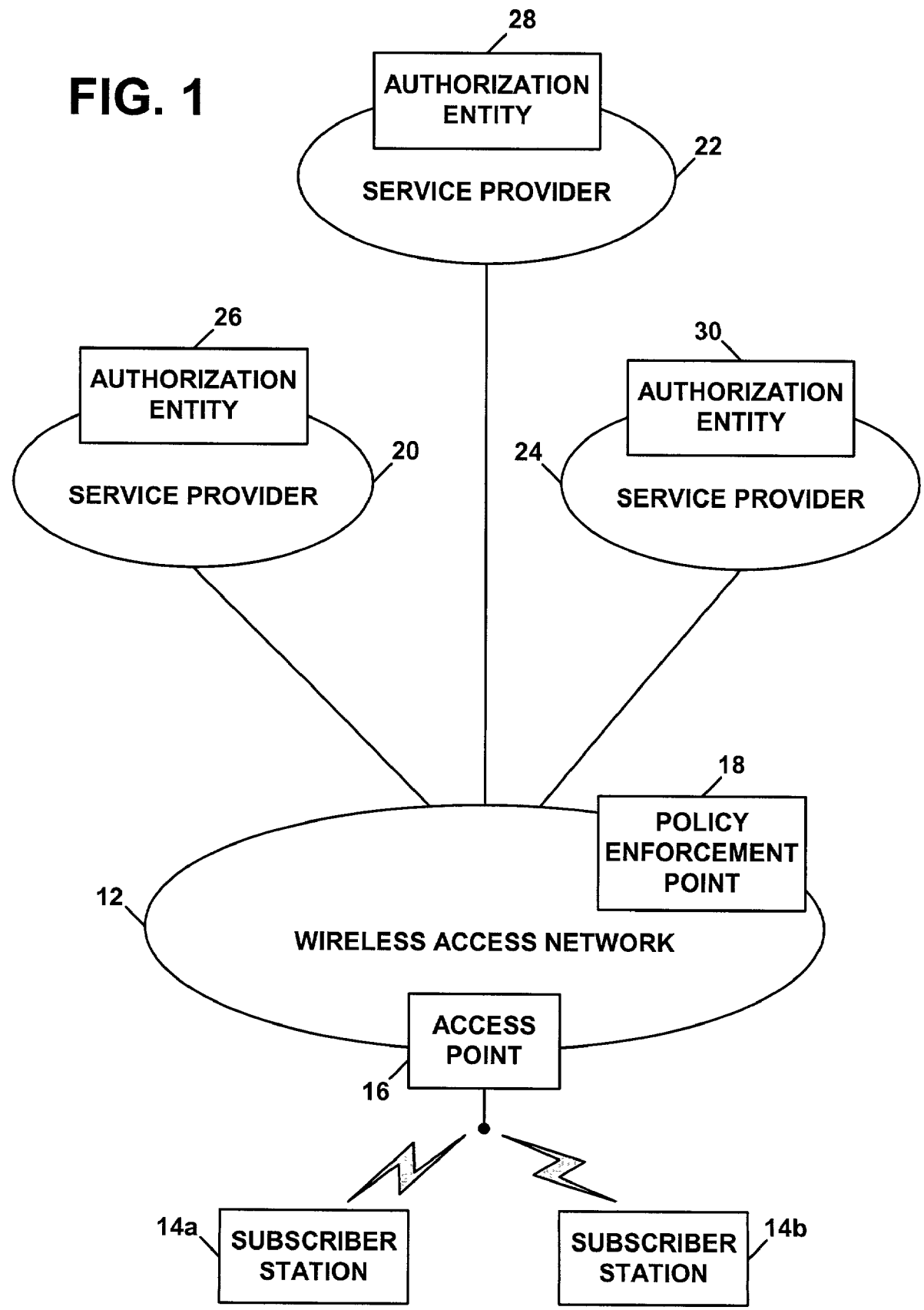
FIG. 1 is a generalized block diagram of a communications system in which the exemplary embodiment can be employed.
Figure 2:
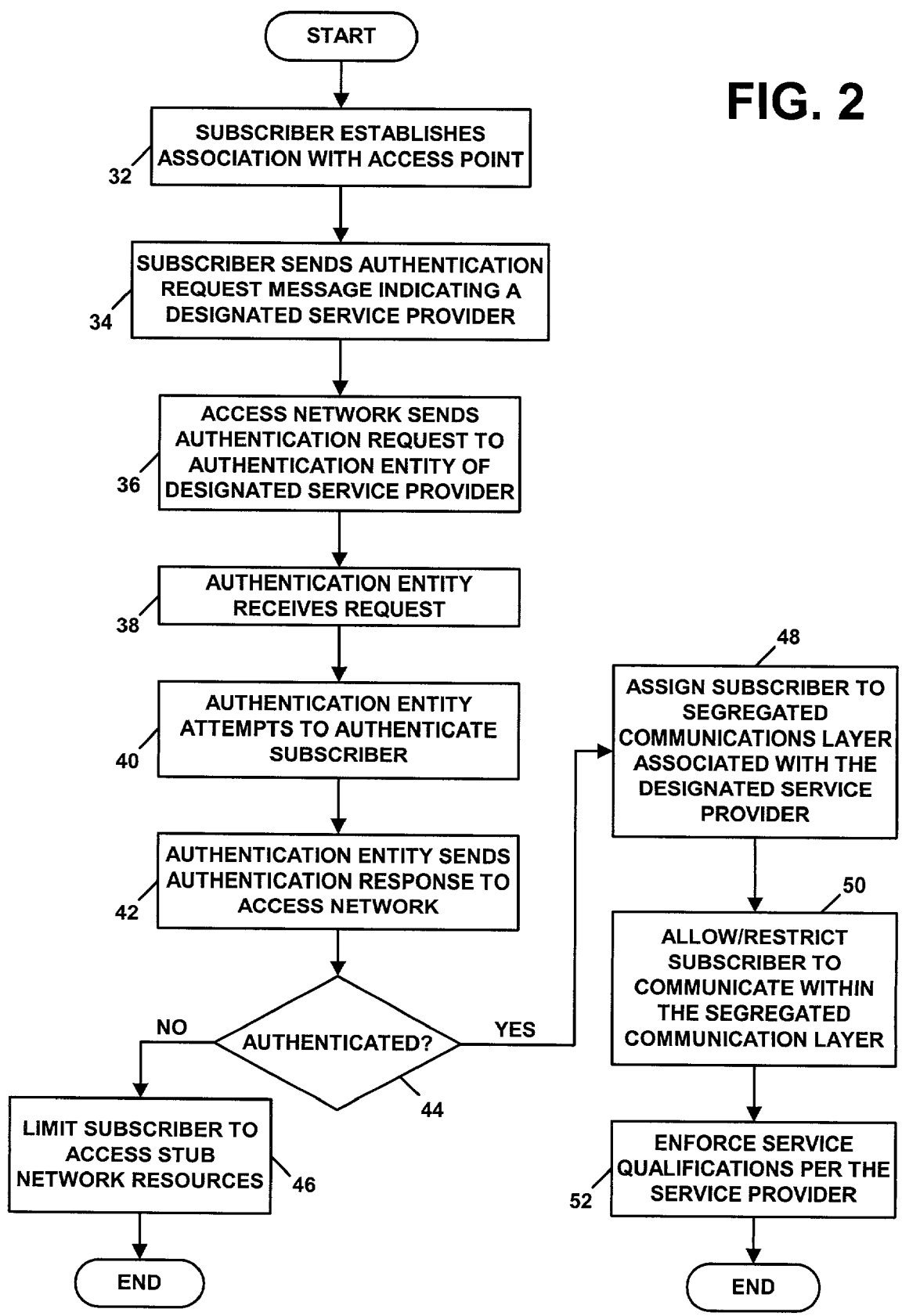
FIG. 2 is a flow chart depicting functions that can be carried out according to the exemplary embodiment.

Referring to the drawings, FIG. 1 is a generalized block diagram of a communications system 10 arranged in accordance with an exemplary embodiment of the invention, and FIG. 2 is a flow chart depicting functions that may be performed in the arrangement of FIG. 1. As shown in FIG. 1, system 10 includes an access network 12 (e.g., an 802.11 WLAN), which is arranged to serve exemplary subscriber stations 14a, 14b via one or more suitable access points 16. The access network is shown to include a policy enforcement point 18 (possibly integrated with or embodied in the access point 16), which can operate to restrict or allow various types of communications in the access network. The access network is shown, in turn, coupled with multiple service provider systems 20, 22 and 24. Each service provider system is then shown to include a respective authentication entity 26, 28, 30.

Referring now to the flow chart of FIG. 2, at block 32, the subscriber station 14 establishes an association with the access network, such as via a radio-link layer coupling between the subscriber station and the access point 16. At block 34, the subscriber station then sends an authentication request message into the access network, identifying both (i) a designated one of the service provider systems (e.g., a service provider ID, for instance) and (ii) one or more authentication credentials (such as subscriber ID (e.g., user ID or station ID) and password). For example, the authentication request message might identify service provider system 20 and might provide a username and password for a user of the subscriber station.

At block 36, the access network then sends the authentication request message (possibly reformatted or changed in some respect) to the authentication entity of the service provider system designated by the request. Continuing with the example, at block 38, authentication entity 26 of service provider 20 would thus receive the request. At block 40, authentication entity 26 would then attempt to authenticate the subscriber station based on the authentication credentials carried in the request. For instance, the authentication entity 26 might refer to a subscriber profile store maintained by the service provider, to determine whether a subscriber record exists for the user and/or subscriber station. Further, upon finding a subscriber record in the profile store, the authentication entity might obtain a record of service qualifications specified by the subscriber record, or might otherwise obtain or derive service qualifications for the subscriber.

In turn, at block 42, the authentication entity will send an authentication response message to the access network. The authentication response will preferably include an indication (e.g., a Boolean indication) of whether the subscriber station is authenticated. Further, if the subscriber station is authenticated, the response will preferably include an indication of the subscriber station's service qualifications, such as types and extents of communication in which the service provider authorizes the subscriber station to engage.

The policy enforcement point 18 on the access network then restricts or allows access network communications with (to and/or from) the subscriber station based on the authentication response. In particular, at block 44, the policy enforcement point determines whether or not the designated service provider has authenticated the subscriber station. In response to a determination that the service provider did not authenticate the subscriber station, at block 46, the policy enforcement point limits the subscriber station to access only default resources of the access network.

On the other hand, in response to a determination that the service provider authenticated the subscriber station, at block 48, the policy enforcement point or other entity in the access network may assign the subscriber station to a segregated communication layer, such as a particular IP subnet, established for the designated service provider. In that segregated layer, the policy enforcement point may be arranged to handle communications according to a set of handling logic specific to the service provider. And at block 50 the policy enforcement point then allows the subscriber station to communicate within that segregated communication layer. Further, at block 52, the policy enforcement point may restrict or allow communications pursuant to the service qualifications (if any) indicated in the authentication response.

As a result, the subscriber station will be able to carry out services as authorized by the designated service provider (e.g., engaging in certain types or levels of communications). Further, as the subscriber station operates within a segregated communication layer associated with that service provider, the subscriber station (or a user of the subscriber station) may perceive the access network to be an operative extension of the service provider. For instance, the access network can provide the subscriber with services customized to reflect the service provider.

Advantageously, multiple subscribers operating in the access network may thus be served concurrently by multiple different service providers. And by the same token, multiple service providers can provide services to their respective subscribers concurrently via the common access network.

For instance, one subscriber station 14a might access (and enjoy or be restricted by) the services of one service provider 20 via the access network 12, while another subscriber station 14b accesses the services of another service provider 22 via the same access network 12. With the benefit of the exemplary arrangement, each subscriber station may benefit from and be billed by its respective designated service provider.

2. Exemplary Architecture

Figure 3:
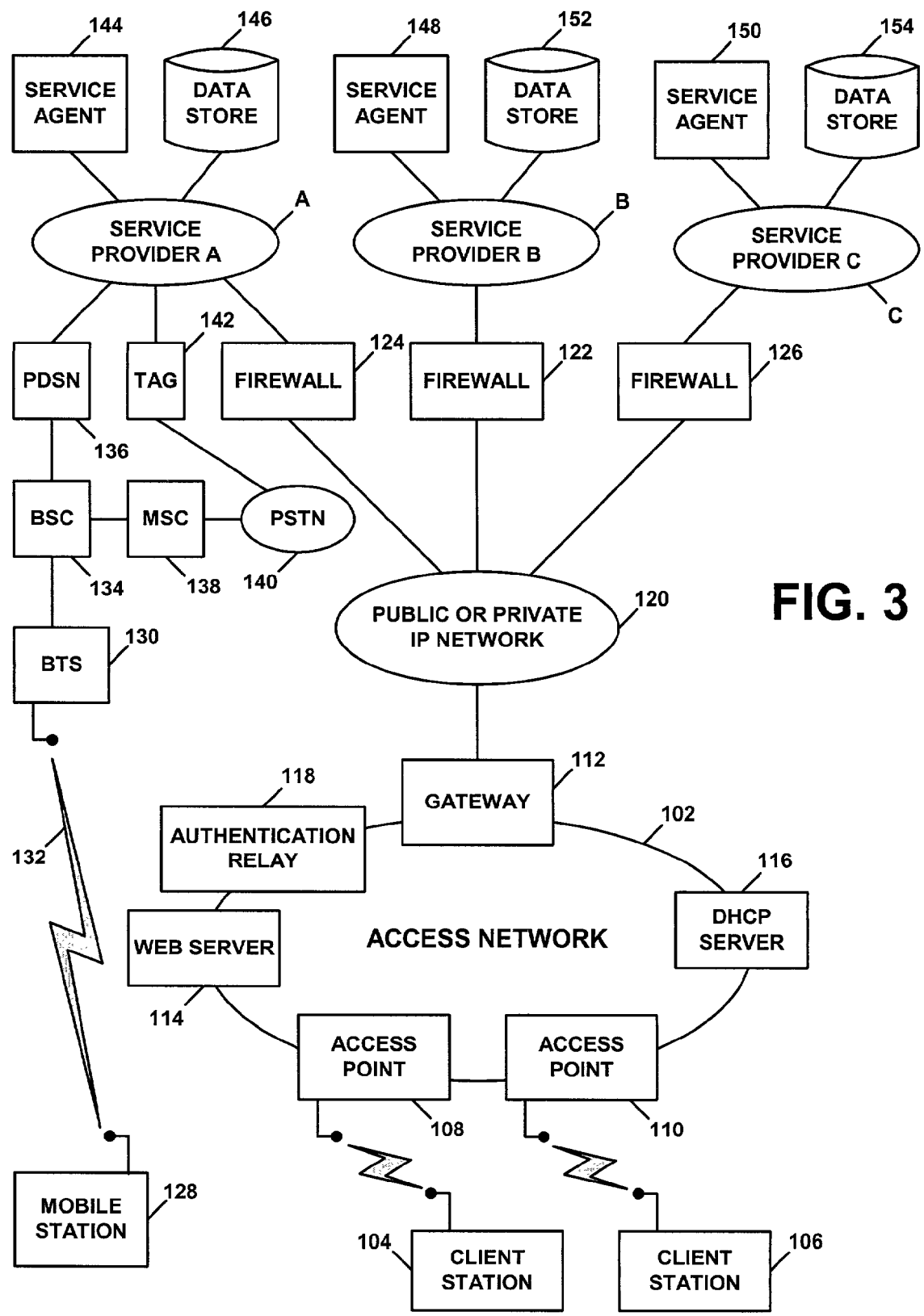
FIG. 3 is a more detailed block diagram of a communications system in which the exemplary embodiment can be employed.
Figure 4:
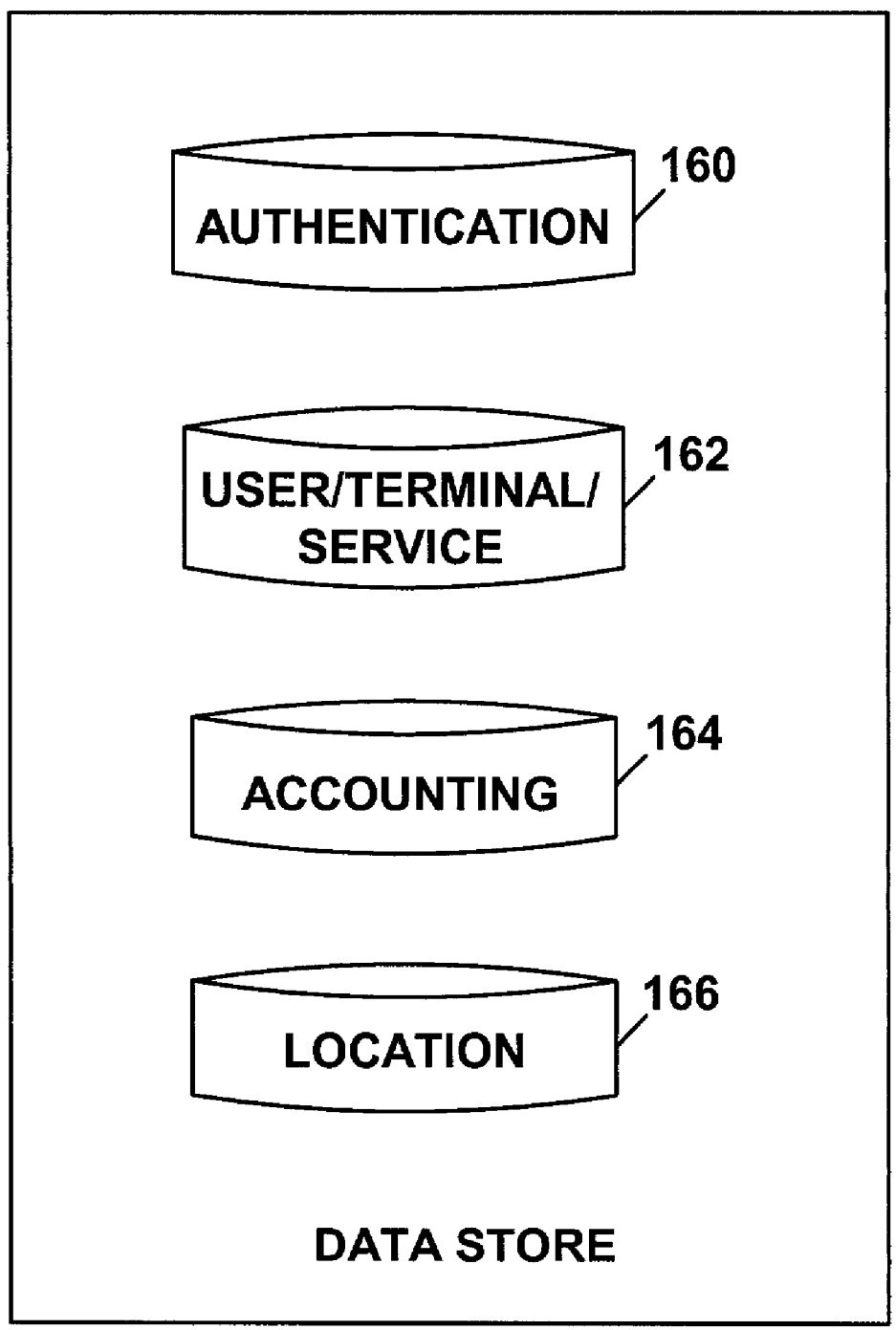
FIG. 4 is a block diagram of a data store suitable for use in the system shown in FIG. 3.

Turning now to FIG. 3, a more detailed block diagram is presented to help further illustrate a possible arrangement and operation of the invention. It should be understood that this and other arrangements described herein are provided for purposes of example only, and other arrangements and other elements (e.g., machines, interfaces, functions, orders of elements, etc.) can be used instead and some elements may be omitted altogether. Further, as in most communications applications, those skilled in the art will appreciate that many of the elements described herein are functional entities (each sometimes referred to as a particular "function") that may be implemented as discrete components or in conjunction with other components, in any suitable combination and location.

FIG. 3 depicts a system that includes an access network 102 arranged to communicate with or interconnect client stations, of which exemplary stations 104, 106 are shown. Each client station may be operated by a respective user. As such, the station and/or the user may be referred to as a "subscriber." Further, a mobile station or user of a mobile station may be referred to as a mobile subscriber or a wireless subscriber.

The access network may be a packet-switched network (e.g., an IP network), so that communications are carried as individually-routed packets through nodes of the network. Further, the access network can be assumed, by way of example, to be or include a WLAN such as an 802.11 WLAN. Therefore, the access network further includes one or more wireless access points (APs) (or access point functions), of which exemplary APs 108, 110 are shown. Two exemplary client stations (e.g., mobile stations) 104, 106 are shown, communicating with the APs via a wireless medium such as a radio frequency air interface for instance.

Exemplary access network 102 is shown to include or enable communication between a gateway function 112, a web server function 114, a DHCP server function 116, and an authentication relay function 118. The network may include other entities as well.

Gateway 110 provides connectivity between the access network and a public or private IP network 120 such as the Internet for instance. In the exemplary arrangement as shown, IP network 120, in turn, provides connectivity to a plurality of discrete service provider networks (service provider systems), of which exemplary networks A, B and C are shown, corresponding respectively with service providers A, B and C. Each service provider network might be a packet-switched network and might provide a respective firewall 122, 124, 126, for security.

The various service providers may take any of a variety of forms, and each may or may not normally be in the business of providing communication services to subscribers. For example, service provider A might be a wireless communications carrier, which provides voice and data communication services to subscribers.

To provide data service to a mobile station 128, for instance, service provider A might include a base transceiver station (BTS) 130, which communicates with the mobile station 128 via an air interface 132. The BTS may then communicate with a base station controller (BSC) 134, which communicates in turn with a packet data serving node (PDSN) 136. The PDSN 136 then functions as a gateway to network A and in turn to IP network 120. In this arrangement, mobile station 128 may establish a point to point protocol (PPP) session with PDSN 136 and, through PDSN 136, engage in packet communications with entities on IP network 120.

To provide voice service to mobile station 128, service provider A might further include a mobile switching center (MSC) 138, which provides connectivity between the BSC 134 and the public switched telephone network (PSTN) 140. Alternatively or additionally, network A might include a trunk access gateway (TAG) 142, which provides connectivity between network A and the PSTN 140. Thus, mobile station 128 can engage in voice communications with entities on PSTN 130, along a path comprising BTS 130, BSC 134, and MSC 138. Or mobile station 128 may alternatively engage in voice communications over a path comprising BTS 130, BSC 134, PDSN 136 and TAG 142. Other arrangements are also possible.

Service provider A might also include a service agent function 144 on network A. The service agent function 144 can function to assist in processing communications carried by service provider A. For instance, when a gateway such as PDSN 136 (and/or a SIP proxy, for instance) detects a communication to or from a subscriber of service provider A, the gateway might signal up to service agent 144 for guidance. Service agent 144 might then reference a data store 146 that defines services and profile information and may thereby determine how the communication should be handled. The service agent may then signal back to the gateway or to another enforcement point, instructing how to handle the communication.

As other examples, service providers B and C might be in businesses other than the communications business. For instance, service provider B might be a commercial airline. And, as yet another example, service provider C might be a national restaurant chain. Nevertheless, FIG. 3 depicts networks B and C as having respective service agents 148, 150 and data stores 152, 154, similar to network A. The reason for including these components in the exemplary embodiment will be described below.

In the exemplary embodiment, gateway 112 on network 102 may be an Ethernet switch and/or a router, through which all packet communications on access network 102 pass on their way to or from their destinations. A suitable gateway 112 could be embodied in a programmable "web switch" of the type available from Nortel Networks or Foundry Networks for instance. However, other implementations are possible as well.

In accordance with the exemplary embodiment, gateway 112 will include packet control logic (software, firmware and/or hardware), so as to be able to inspect and manipulate packets based on various criteria. For instance, the gateway may be programmed to allow or disallow transmission of packets based on information carried in packet headers (such as source address, destination address, type of communication, etc.) and/or to route or re-direct packets to predetermined destinations based on similar information.

Through these or other techniques, the gateway will preferably be programmed (statically and/or dynamically) to segregate packet traffic into logical layers of the access network 102. One layer will be in place as a default access network layer, to serve subscribers who have established connectivity with the access network but have not been authenticated (or authorized) by a service provider such as provider A, B or C. In turn, other discrete layers may be provided to correspond with each of the service providers respectively. Thus, a separate layer may be provided for service provider A, another separate layer may be provided for service provider B, and another separate layer may be provided for service provider C. (Alternatively, there could be some overlap; for instance, a separate layer could be provided for service provider A, while a common layer could be provided for service providers B and C.)

Each logical layer of access network 102 can be defined in any of a variety of ways. For example, each layer can be set up as separate IP subnet on network 102, and subscribers to be served by the layer may be assigned IP addresses within that subnet. For example, IP subnet 10.3.x.x could be defined as the default access network subnet for subscribers who have gained access to network 102 but have not been authenticated by an outside service provider ("default subnet"). IP subnet 10.4.x.x could be defined as a subnet for subscribers who have been authenticated by service provider A ("subnet A"), IP subnet 10.5.x.x could be assigned as a subnet for subscribers who have been authenticated by service provider B ("subnet B"), and IP subnet 10.6.x.x could be defined as a subnet for subscribers who have been authenticated by service provider C ("subnet C").

Gateway 112 can then include logic that causes it to take special actions with respect to packet traffic in these various subnets, depending on the subnet. These special actions can function to distinguish the layers and therefore to distinguish services based on the authenticating service provider (or lack thereof). The particular actions can take any of a variety of forms, the some examples of which will now be described.

For instance, the gateway might be programmed with default logic indicating how to handle packets traveling to and from an address in the default subnet. As an example, the default logic might restrict unauthenticated subscribers to a limited set of resources, such as to access only web server 114 and/or to communicate only with others on the access network (but not outside of the access network). To do so, the default logic could include access control rules that prevent packets from traveling between an address on the default subnet and an address outside of the access network but allow packet traffic between nodes on the access network. Further, the default logic could cause the gateway to redirect to web server 114 any HTTP GET requests originating on the default subnet and destined for an IP address outside of the access network.

As another example, the default logic might allow communications between the default subnet and addresses outside the access network, but the default logic might restrict those communications in some manner. For instance, the default logic might restrict the quality of service for such communications, by labeling outgoing packets with a relatively low quality of service tag or in some other manner. The default logic might also restrict the types of outgoing communications that can be allowed, as reflected in the headers of outgoing packets from the default subnet. For example, the logic might bar outgoing FTP packets. As another example, the logic might bar outgoing SIP packets, so as to prevent a subscriber on the default subnet from initiating a session through use SIP signaling. Similar restrictions could be put in place for other packet types or protocols (such as HTTP, RTP, etc.)

The gateway may in turn be programmed with a logic set A, indicating how to handle communications to and from addresses on subnet A. Logic set A might direct the gateway to allow all packet traffic between addresses on subnet A and addresses outside of the access network. As such, logic set A might allow subscribers on subnet A to send SIP and RTP packets into IP network 120, so as to be able set up and carry on real-time media communications. Provided that service provider A is appropriately equipped, service provider A might thereby carry Voice over IP (VoIP) communications between a subscriber on subnet A and TAG 128, so as to allow the subscriber to engage in voice communications over PSTN 130.

Logic set A might also allow greater freedom for communications between addresses on subnet A and addresses outside of the access network. For instance, logic set A might grant a relatively high level of service quality to packets traveling from an address on subnet A to an address on IP network 120. Logic set A might also allow other types of IP communications, such as FTP traffic for instance.

Further, logic set A might cause the gateway to customize packet traffic in a manner that corresponds to service provider A. For example, logic set A might indicate that, when the gateway receives an HTTP response packet destined for an address on subnet A, the gateway should retrieve from storage and insert in the HTTP response packet a set of HTML code that defines a banner advertisement for service provider A. Thus, when a subscriber on subnet A receives a web page from a web server, the gateway may effectively inject into the web page a banner ad for service provider A.

The gateway may then be programmed with a logic set B, indicating how to handle communications to and from addresses on subnet B. This logic might differ from logic set A and from the default logic. For example, logic set B might bar the communication of SIP packets from an address on subnet B to an address outside of the access network. But logic set B might allow FTP and RTP communications between addresses on subnet B and addresses on IP network 120.

As another example, logic set B might cause the gateway to customize packet traffic in a manner that corresponds to service provider B. For example, logic set B might indicate that, when the gateway receives an HTTP response packet destined for an address on subnet B, the gateway should retrieve from storage and insert in the HTTP response packet a set of HTML code that defines a banner ad for service provider B. Thus, when a subscriber on subnet B receives a web page from a web server, the gateway may effectively inject into the web page a banner ad for service provider B.

In turn, the gateway may be programmed with a logic set C that indicates how to handle communications to or from addresses on subnet C. This logic might differ from logic set A, logic set B and the default logic set, and it may similarly take any of a variety of forms.

The gateway 112 preferably also includes a record of which access point is serving each client station. To accomplish this, when a client station gains admission to the access network via an access point, the access point may signal to the gateway 112. The gateway may then record an indication that the client station is being served by that access point.

Moving now to other entities on access network 102, the DHCP server function 116 is in place to assign temporary or permanent IP addresses to client stations 104, 106, through communication with DHCP client applications running on the client stations. As such, the DHCP server function 116 can take the form of a computer programmed with a DHCP server application. The DHCP server function 116 can be logically integrated within gateway 112, such as in the form of a DHCP server program executable by a gateway processor.

Preferably, the DHCP server function 116 maintains a pool of IP addresses available for assignment to client stations operating in access network 102. The IP addresses may include addresses in each of the subnets, including addressed in the default subnet, addresses in subnet A, addresses in subnet B and addresses in subnet C.

In the exemplary embodiment, when a subscriber first becomes associated with the access network, gateway 112 may cause the DHCP server 116 to assign to the client station an IP address in the default subnet. The gateway may then restrict communications with the client station as described above for instance. In turn, once the subscriber is authenticated by one of the service providers A, B or C, gateway 112 may cause the DHCP server 116 to assign to the client an IP address in the respective subnet. For instance, if a client is authenticated by service provider A, gateway 112 may instruct DHCP server 116 to assign to the client an IP address in subnet A.

The web server function 114, in turn, can take the form of a computer programmed with a web server application. As such, the computer may receive HTTP GET requests (requests for web pages (or "cards" for microbrowser use)) from browsers running on client stations 104, 106, and respond by sending web pages to the requesting browsers.

In accordance with the exemplary embodiment, web server 114 may host an authentication-invite web page, which can be accessed by a browser on a client station for purposes of submitting an authentication request to a designated service provider. In order to force an authentication attempt when a subscriber first enters access network 102, gateway 112 can be programmed to intercept HTTP GET requests destined for addresses outside network 102 from any subscriber who has not yet been authenticated, and to redirect those requests to the authentication-invite page on web server 114. Alternatively, a subscriber may voluntarily browse to the authentication-invite page, in order to submit an authentication request.

The authentication-invite web page can be encoded with a form that a user can complete in order to submit an authentication request. As such, the web page can include a field (e.g., a drop down box) for a user to select a service provider from among those available (in the present example, service provider A, service provider B or service provider C). Further, the web page can include fields for the user to input a name (e.g., a SIP address) and password and/or other credentials. The web page can then include a "Submit" button, which, when selected by the user, invokes a program script to cause the authentication request to be sent to a specified address, preferably that of the authentication relay function 118. (Alternatively, the request could be sent to the web server, and the web server could programmatically forward it to the authentication relay function 118 if appropriate.)

The authentication relay function 118 is, in turn, preferably also an application that runs on a computer or other entity. For instance, the authentication relay may be integrated with gateway 112, with web server 114, or with another entity. In accordance with the exemplary embodiment, the authentication relay mediates authentication requests submitted by subscribers on the access network. In particular, the authentication relay receives an authentication request from (or on behalf of) a given subscriber and forwards the authentication request (or generates and sends a corresponding authentication request) to an authentication entity of a service provider designated in the authentication request.

As such, the authentication relay might include or have access to a translation table that correlates service providers with network addresses of authentication entities arranged to perform authentication for those service providers. Each service provider might be designated by a respective service provider ID, and the translation table might indicate an IP address where the service provider's appointed authentication entity is located. For example, the translation table might correlate a service ID of service provider A with an IP address of an authentication entity in place to authenticate subscribers who are served by service provider A. As another example, the translation table might correlate a service ID of service provider B with an IP address of an authentication entity in place to authenticate subscribers who are served by service provider B.

The authentication relay 118 might receive authentication requests generated and sent from the authentication-invite web page. Alternatively, the authentication relay function might receive authentication requests generated and sent in some other manner. For instance, a client station such as station 104 might be programmed with logic to autonomously submit an authentication request upon admission to access network 102. Such a client station might be sold or otherwise issued by a specific service provider, such as service provider A, B or C. (For instance, the client station could be a mobile station issued by service provider A and might be dual mode so that it can operate both via BTS 130 and via access network 102.)

In the exemplary embodiment, the authentication request that the authentication relay 118 receives will include in it a service ID or other indication of a designated service provider. Further, it will include in it subscriber authentication credentials, such as device ID or username and password for instance.

In addition, the authentication request will preferably include an indication of which access point is currently serving the subscriber. The gateway 112 is well suited to insert this indication in the authentication request, since the authentication request preferably passes through the gateway 112 on its way to the authentication relay 118 and since the gateway preferably has a record of which access point is serving which subscriber. Alternatively, the access point may insert the indication. Still alternatively, the client station itself could insert the indication. Other examples are also possible.

In turn, the authentication request that the authentication relay 118 sends to the authentication entity of the designated service provider (possibly identical to the request that it receives) also preferably includes that information as well.

The authentication relay 118 can send an authentication request to the authentication entity of the designated service provider in any manner, preferably according to an agreed protocol. The translation table maintained by the authentication relay 118 might indicate which protocol to use for communicating with each respective authentication entity. For instance, if the authentication entity is a RADIUS server, the authentication relay might send the authentication request according to the RADIUS protocol. Another exemplary protocol might be Diameter.

As noted above, each service provider includes a respective service agent function 144, 148, 150. In the exemplary embodiment, these service agents can be the authentication entities of the respective service providers. To accomplish this, each service agent may include or have access to an authentication server, such as a RADIUS or AAA server. Each service agent may then be programmed or otherwise arranged to receive authentication requests, to determine whether and to what extent subscribers are allowed to access services (i.e. to authorize subscribers), and to provide authentication responses.

The authentication relay 118 preferably communicates with the authentication entity on a given service provider network via a secure tunnel. In the arrangement shown in FIG. 3, for instance, the tunnel to each service agent passes through IP network 120, a respective firewall, and the respective service provider network. Alternatively, the tunnel could be a direct connection such as a T1 line through suitable gateways and/or switches. The level of security (if any) is a matter of choice.

In the exemplary embodiment, the service agent of a given service provider authenticates a subscriber by reference to a data store. For instance, as noted above, service agent 144 may have access to data store 146, service agent 148 may have access to data store 152, and service agent 150 may have access to data store 154. Alternatively, multiple service providers may employ or refer to a common service agent and/or a common data store (e.g., a meta-directory).

In the exemplary embodiment, the data store of each service provider may take the form of a flat file or a more complex database (e.g., an Oracle database) and preferably includes data to facilitate authenticating subscribers. Further, the data store might also include data to facilitate authorizing and billing subscribers and to facilitate other value-added services, such as services keyed to the locations in access network 102 where subscribers are operating. As such, the arrangement of each data store could take various forms and may vary from service provider to service provider. By way of example, a data store might include (i) authentication records 160, (ii) user/terminal/service records 162, (iii) accounting records 164, and (iv) location records 166.

The authentication records 160 preferably include information that will allow the service provider to authenticate subscribers who are seeking to operate on access network 102 (or, for that matter, on any other access network). As such, the authentication records 160 preferably include authentication information for at least those subscribes who have subscribed to service of the service provider. But the authentication records may also include authentication information for other subscribers, such as subscribers of another service provider. In this regard, for instance, service providers might enter into agreements according to which one service provider provides services for subscribers of another service provider.

The particular form of the authentication records may vary from case to case. As an example, each record might be keyed to a subscriber ID and might indicate an associated password for the subscriber. Upon receipt of an authentication request that indicates a subscriber ID and password, the service agent may refer to the data store and determine whether the password matches that associated with the subscriber ID. As another example, if the subscriber ID is a station ID for instance, each record may merely indicate a station ID (without a password). Upon receipt of an authentication request that indicates the station ID, the service agent may then refer to the data store to determine whether the device ID is listed.

The user/terminal/service records 162 preferably define service-qualifications on a per-subscriber (e.g., per-user and/ or per-station/terminal) basis. For instance, the records might specify for each of the service provider's subscribers what types of services each subscriber is authorized to access, and/or an extent (e.g., duration, quality, etc.) to which the subscriber can access particular services. These authorizations may be keyed to service levels paid for by the subscribers. For instance, one subscriber might pay more to have access to more or better services than another subscriber. Further, the user/terminal/service records may correlate users with terminals, such as by indicating which client station a particular user is currently using.

As an example, the user/terminal/service records might include for each subscriber an indication of whether the subscriber is entitled to engage in certain types of communications over IP network 102. For instance, a subscriber profile record might indicate whether a subscriber is allowed to engage in HTTP communications, FTP communications and/ or SIP communications. Further, a user/terminal/service records might indicate a level of bandwidth that should be allocated to the subscriber for particular types of communications over the IP network 102, or over the access network 102.

And as another example, the user/terminal/service records might indicate that a subscriber is allowed to engage in only a predefined quantity of communication. For instance, the user/terminal/service records might indicate that a subscriber is allowed to send only a designated number of bits, bytes or packets of data, or only a designated number of SIP INVITE (session initiation) requests. Other examples are also possible.

The accounting records 164, in turn, may define billing records for individual subscribers or groups of subscribers. For instance, once a service provider has authenticated a subscriber operating in access network 102, the service provider may establish a billing record that can be used to bill the subscriber for the service. Further, in the event the service provider carries or conducts particular communications for the subscriber during the subscriber's operation in the access network, the service provider may establish or modify billing records accordingly.

The location records 146 preferably establish where particular subscribers are located. For instance, once a service provider authenticates a subscriber operating in a particular access network or portion thereof, the service provider may store in the location records 146 an indication that the subscriber is operating at that location. As indicated above, the authentication request received by the service provider may indicate the access point currently serving the subscriber. Therefore, the service provider may store an indication of that access point as the location where the subscriber is operating.

In the exemplary embodiment, the service provider may then later use that location indication to facilitate providing a service to the subscriber in the access network. For instance, the service provider may later transmit to the subscriber an advertisement for a store or other business establishment in or near which the subscriber is located (e.g., a store by which the access point currently serving the subscriber is located), as determined by a translation table that correlates access-network locations (e.g., access point identifiers) with business establishments. The service provider may then charge the store for this advertising service. As another example, the service provider can make the location information available to another party, to allow the other party to provide location-based services for the subscriber. Other examples are possible as well.

In the exemplary embodiment, when the service of a service provider receives an authentication request, the service agent will seek to authenticate the subscriber by reference to the authentication records 160. Further, the service agent may seek to authorize the subscriber by reference to the user/ terminal/service records 162. In addition, the service agent may record billing information in the accounting records 164. And the service agent may record in location records 166 an indication of where the subscriber is located.

The service agent will then generate an authentication response, which it will send back down to the authentication relay 118 or to another designated entity (e.g., directly to the gateway 112.) The authentication response will preferably indicate whether or not the service provider has authenticated the subscriber (e.g., as a Boolean indication), and may provide service qualification information indicating types and extents of services to which the subscriber is entitled.

The authentication relay 118, in turn, will be programmed or otherwise arranged to receive the authentication response and to forward the response (or a derivative of the response) to an enforcement point in the access network 102. In the exemplary embodiment, the enforcement point is preferably gateway 112.

Thus, the gateway will receive a message indicating whether or not the subscriber has been authenticated by the designated service provider, preferably together with an indication of the service provider. For instance, if service provider A has authenticated client station 104, the message may identify the subscriber (e.g., by subscriber ID), identify service provider A (e.g., by service provider ID) and indicate successful authentication. Further, the message may provide the gateway with service qualifications for the subscriber, possibly conveyed in a markup language such as Diameter (e.g., BANDWIDTH=x bps, FTP=false, SIP=true, etc.) Another suitable protocol for communicating the authentication response is the recently established 802.1x protocol (which incorporates EAP (extensible authentication protocol)).

According to the exemplary embodiment, assuming successful authentication of a subscriber by a designated service provider, the gateway 112 may be programmed to assign the subscriber to the logical network layer associated with the designated service provider (or to cause the subscriber to be assigned to that layer). For instance, if service provider A authenticates the subscriber, the gateway may assign the subscriber to subnet A. If service provider B authenticates the subscriber, the gateway may assign the subscriber to subnet B. And if service provider C authenticates the subscriber, the gateway may assign the subscriber to subnet C.

Assuming that the subscriber has already been assigned to the default subnet (or other default layer of the access network 102), the gateway could cause the subscriber to be assigned to the subnet of the authenticating service provider by directing the subscriber to release its current IP address and to request a new IP address. And the DHCP server 116 would then assign to the subscriber an IP address in the subnet of the service provider. (In an exemplary embodiment, the DHCP server could assign each IP address with a short lease, so that the subscriber periodically requests a new address; upon expiration of the lease on the default IP subnet address, the DHCP server 116 can then assign an IP address in the service provider subnet.)

As noted above, the gateway is then preferably arranged to provide distinct levels and types of service on each segregated layer. Thus, if a subscriber has been authenticated by service provider A and the subscriber has therefore been assigned to subnet A, the gateway might apply its logic set A for the subscriber. And if a subscriber has been authenticated by service provider B and the subscriber has therefore been assigned to subnet B, the gateway might apply its logic set B for the subscriber. Or if the subscriber has not been authenticated, so the subscriber remains on the default subnet, the gateway might apply its default logic for the subscriber.

In addition, if the authentication response carries service qualification information for the subscriber, the gateway might record that service qualification information for use with respect to communications by the subscriber. Effectively, the gateway can maintain a local profile for the subscriber. Logic in a subscriber's local profile could take precedence over logic defined for the subnet on which the subscriber is operating. Or the subnet logic could take precedence over the local profile logic. This is a matter of choice.

3. Exemplary Operation

As an example of operation, assume that a user has an 802.11b-capable client station 104. The user brings the client station into an department store. Assume that the department store is equipped with an 802.11b WLAN, including APs. Assume further that the APs of the WLAN provide for open association. I.e., the APs allow any 802.11b-compliant client station to gain radio-link access to the AP and perhaps then via the WLAN to a set of default WLAN resources. (In an alternative arrangement, the APs could require a client station to send a particular service set ID (SSID) of the WLAN in order to gain access to the WLAN).

When the user turns on the client station in the airport terminal, the client station may thus establish an association with a nearby AP, through normal procedures. (E.g., either the client station or the AP could emit a beacon that the other would detect, thereby causing the other to send out an access request.) For instance, the client station 104 might gain association with AP 108.

In turn, the a DHCP client application running on the client station would send a DHCP request via the MAC layer (radio-link layer) and the access network to the gateway, and the gateway would consult the DHCP server to get an IP address for the client station. In particular, the DHCP server would assign an IP address in the default subnet, so that the client station will be able to access only default access network resources.

The gateway would then provide a DHCP response to the client station, assigning the designated IP address to the client station. Given the designated IP address, the client station has thus gained access to resources of the access network, so as to be able to send and receive IP communications within the access network.

Once the client station has thus gained access to the WLAN and has the ability to send and receive IP communications within the access network, the client station will preferably generate and send an authentication request, which would go to the authentication relay. For instance, the user may browse to the authentication-invite web page and may select service provider A and provide authentication credentials. A script underlying the web page may then generate and send the authentication request to the authentication relay.

As described above, the authentication request will preferably indicate (i) the designated service provider, (ii) the subscriber's authentication credentials, and (iii) an indication of the access point serving the subscriber.

Upon receipt of the authentication request, the authentication relay would then read the authentication request to determine which service provider is designated and would determine the network address of the service agent of that service provider. In this example, the authentication relay would determine that service provider A is designated, so the authentication relay would programmatically conclude that the authentication request should be sent to service agent 144. The authentication relay would then send the authentication request to that service agent.

Service agent 144 of service provider A will then receive the authentication request and, based on the credentials in the request, query data store 146 in an effort to determine whether and to what extent the client station should be authenticated. Based on the results of this query, the service agent may then generate an authentication response message and send the authentication response message back to the authentication relay. Further, the service agent may record in the data store an indication of where the client station is currently located.

Once the authentication relay receives the authentication response from the designated service provider, the authentication relay will then forward the response back to the gateway. Assuming successful authentication, the gateway will then assign the client station to a subnet associated with the authenticating service provider. And the client station may then operate on that subnet. Further, if the authentication response or other such message provides the gateway with service qualifications indicated by service provider A, the gateway may record and enforce those service qualifications.

For example, the authentication response provided by service agent 144 might indicate that the client station is authenticated and that the client station is entitled to initiate at most three sessions through use of SIP. Thus, the gateway might record that restriction. As the client station sends SIP INVITE requests, the gateway might decrement a counter for the client station. And, after the client station has sent three SIP INVITE requests, the gateway may then bar any subsequent SIP INVITE requests from the client station. As another example, the gateway might insert into HTTP communications to the client station a banner ad for service provider A or other information specific to service provider A.

According to another aspect of the exemplary embodiment, the service provider itself can customize services provided to the subscriber in the access network. For instance, while the client station is operating on access network, the service agent (or other entity) might determine, from location records 166 in data store 146, that the client station is located near AP 108. The service agent or other entity might then send to the client station a message (e.g., e-mail, SMS, HTTP PUSH or other type of message) providing information about a special deal being offered in a nearby department in the department store. Service provider A may then charge the department store for the service of sending that message to the client station.

As another example, the service agent could send a broadcast or multicast message (e.g., a service provider advertisement) out to all of the client stations in the access network who are operating on the service provider's segregated layer of the access network. Preferably and beneficially, such as message would not reach client stations that have been authenticated by other service providers or who have not yet been authenticated by a service provider, since those client stations are operating on another segregated layer.

According to yet another aspect of the exemplary embodiment, gateway 112 may be programmed to function as a mobile IP foreign agent. In turn, the service agent of the service provider that authenticates the subscriber may be programmed to function as a mobile IP home agent. For instance, service agent 144 in network A might be the home agent for subscribers of service provider A. When one such subscriber registers in access network 102, gateway 112, as foreign agent, may register with the subscriber's home agent, service agent 144.

As a result, communications to or from the subscriber might be made to pass through the service agent. The service agent may then act upon the communications. For example, the service agent itself might modify or communications based on various factors. As another example, the service agent can provide stateful services for the subscriber, such as prepaid data communications for instance. Other examples are also possible.

An exemplary embodiment of the present invention has been described above. Those skilled in the art will understand, however, that changes and modifications may be made to this embodiment without departing from the true scope and spirit of the present invention, which is defined by the claims.

We claim:

1. A method comprising:
   receiving from a subscriber station on an access network an authentication request, the authentication request identifying the subscriber station and identifying a designated service provider from among a plurality of service providers;
   sending the authentication request to the designated service provider;
   receiving from the designated service provider an authentication response indicating successful authentication of the subscriber station by the designated service provider, wherein the authentication response includes a service qualification that indicates at least one of (i) one or more types of services authorized for the subscriber station and (ii) one or more extents of service authorized for the subscriber station, wherein the service qualification specifies one or more types of communication and, for each specified type of communication, specifies whether the subscriber station is allowed to engage in the specified type of communication;
   responsive to the authentication response, assigning the subscriber station to operate in a designated layer of the access network set aside for subscribers that have been authenticated by the designated service provider and to operate according to the service qualification, wherein the access network is an IP network and the designated layer is an IP subnet, and wherein assigning the subscriber station to operate in the designated layer comprises assigning to the subscriber station an IP address in the IP subnet; and
   serving the subscriber station in the designated layer of the access network and pursuant to the service qualification indicated in the authentication response,
   wherein serving the subscriber station in the designated layer comprises handling communications with the subscriber station according to a logic set established for the designated layer,
   wherein handling communications with the subscriber station according to the logic set established for the designated layer comprises (i) detecting a packet bearing the IP address assigned to the subscriber station, and (ii) responsively applying the logic set to restrict transmission of the packet,
   wherein handling communications with the subscriber station according to the logic set established for the designated layer comprises disallowing at least a predetermined type of communication from passing from the subscriber station to outside of the access network, and
   wherein serving the subscriber station pursuant to the service qualification indicated in the authentication response comprises, for each type of communication specified in the service qualification, allowing or disallowing the type of communication by the subscriber station as specified by the service qualification.

2. The method of claim 1, wherein serving the subscriber station in the designated layer of the access network comprises:
   a gateway on the access network detecting a web page being sent to the subscriber station; and
   the gateway modifying the web page to include an advertisement for the designated service provider.

3. The method of claim 1, further comprising prompting the subscriber station to provide the authentication request.

4. The method of claim 3, wherein prompting the subscriber station for the authentication request comprises:
   presenting to a user of the subscriber station a set of the plurality of service providers; and
   prompting the user to select a service provider from among the plurality presented, wherein the user selects the designated service provider from among the plurality.

5. The method of claim 1, wherein the access network comprises a wireless access network.

6. The method of claim 1, further comprising:
   before receiving the authentication response, assigning the subscriber station to operate in a default layer of the access network; and
   handling communications in the default layer according to a default logic set.

7. The method of claim 1, wherein handling communications with the subscriber station according to the logic set established for the designated layer comprises:
   detecting a web page being sent to an address on the designated layer; and
   injecting into the web page information specific to the designated service provider.

8. The method of claim 7, wherein the information comprises an advertisement for the designated service provider.

9. The method of claim 1, wherein the subscriber station communicates via an air interface with the access network.

10. The method of claim 1, wherein disallowing at least the predetermined type of communication from passing from the subscriber station to outside of the access network comprises disallowing all communications from passing from the subscriber station to outside of the access network.

11. A method carried out by an access network, the method comprising:

prompting a first client station to select a service provider from among a plurality of service providers, and receiving a signal from the first client station, indicating a first selected service provider;

sending a first authentication request message for the first client station to the first selected service provider, the first authentication request message indicating authentication information for the first client station;

receiving a first authentication response message from the first selected service provider, the first authentication response message indicating that first client station is authenticated by the first selected service provider, wherein the first authentication response includes a first service qualification that indicates at least one of (i) one or more types of services authorized for the first client station and (ii) one or more extents of service authorized for the first client station, wherein the first service qualification specifies one or more types of communication and, for each specified type of communication, specifies whether the first client station is allowed to engage in the specified type of communication; and in response to the first authentication response message, restricting the first client station to communications in a first logical layer of the access network associated with the first selected service provider and according to the first service qualification, wherein restricting the first client station to communications in the first logical layer of the access network associated with the first selected service provider comprises handling communications with the first client station according to a logic set established for the first logical layer, wherein handling communications with the first client station according to the logic set established for the first logical layer comprises disallowing at least a predetermined type of communication from passing from the first client station to outside of the access network, and wherein restricting the first client station to communications according to the first service qualification comprises, for each type of communication specified in the first service qualification, allowing or disallowing the type of communication by the first client station as specified by the first service qualification.

12. The method of claim 11, further comprising:

prompting a second client station to select a service provider from among a plurality of service providers, and receiving a signal from the second client station, indicating a second selected service provider;

sending a second authentication request message for the second client station to the first selected service provider, the second authentication request message indicating authentication information for the second client station;

receiving a second authentication response message from the second selected service provider, the second authentication response message indicating that second client station is authenticated by the second selected service provider, wherein the second authentication response includes a second service qualification that indicates at least one of (i) one or more types of services authorized for the second client station and (ii) one or more extents of service authorized for the second client station; and in response to the second authentication response message, restricting the second client station to communications in a second logical layer of the access network associated with the second selected service provider and according to the second service qualification.

13. The method of claim 11, wherein disallowing at least the predetermined type of communication from passing from the first client station to outside of the access network comprises disallowing all communications from passing from the first client station to outside of the access network.

14. A communication system comprising:

means for prompting a first client station to select a service provider from among a plurality of service providers, and for receiving a signal from the first client station, indicating a first selected service provider;

means for sending a first authentication request message for the first client station to the first selected service provider, the first authentication request message indicating authentication information for the first client station;

means for receiving a first authentication response message from the first selected service provider, the first authentication response message indicating that first client station is authenticated by the first selected service provider, wherein the first authentication response includes a first service qualification that indicates at least one of (i) one or more types of services authorized for the first client station and (ii) one or more extents of service authorized for the first client station, wherein the first service qualification specifies one or more types of communication and, for each specified type of communication, specifies whether the first client station is allowed to engage in the specified type of communication; and means for responding to the first authentication response message by restricting the first client station to communications in a first logical layer of the access network associated with the first selected service provider and according to the first service qualification, wherein restricting the first client station to communications in the first logical layer of the access network associated with the first selected service provider comprises handling communications with the first client station according to a logic set established for the first logical layer, and wherein handling communications with the first client station according to the logic set established for the first logical layer comprises disallowing at least a predetermined type of communication from passing from the first client station to outside of the access network, and wherein restricting the first client station to communications according to the first service qualification comprises, for each type of communication specified in the first service qualification, allowing or disallowing the type of communication by the first client station as specified by the first service qualification.

15. The communication system of claim 14, further comprising:

means for prompting a second client station to select a service provider from among a plurality of service providers, and for receiving a signal from the second client station, indicating a second selected service provider;

means for sending a second authentication request message for the second client station to the first selected service provider, the second authentication request message indicating authentication information for the second client station;

means for receiving a second authentication response message from the second selected service provider, the second authentication response message indicating that second client station is authenticated by the second selected service provider, wherein the second authentication response includes a second service qualification that indicates at least one of (i) one or more types of services authorized for the second client station and (ii) one or more extents of service authorized for the second client station; and means for responding to the second authentication response message by restricting the second client station to communications in a second logical layer of the access network associated with the second selected service provider and according to the second service qualification.

16. The method of claim 14, wherein disallowing at least the predetermined type of communication from passing from the first client station to outside of the access network comprises disallowing all communications from passing from the first client station to outside of the access network.

* * * * *

UNITED STATES PATENT AND TRADEMARK OFFICE
CERTIFICATE OF CORRECTION

| | | |
|---|---|---|
| PATENT NO. | : 7,617,317 B2 | Page 1 of 1 |
| APPLICATION NO. | : 10/004994 | |
| DATED | : November 10, 2009 | |
| INVENTOR(S) | : Jones et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1354 days.

Signed and Sealed this

Fourteenth Day of December, 2010

David J. Kappos
*Director of the United States Patent and Trademark Office*